(12) United States Patent
Ihlar et al.

(10) Patent No.: US 12,101,663 B2
(45) Date of Patent: Sep. 24, 2024

(54) TECHNIQUE FOR CONTROLLING AND PERFORMING DATA TRAFFIC HANDLING IN A CORE NETWORK DOMAIN

(71) Applicant: Telefonaktiebolaget LM Ericsson (PUBL), Stockholm (SE)

(72) Inventors: Marcus Ihlar, Älvsjö (SE); Maria Luisa Mas Rosique, Tres Cantos (ES); Veronica Sanchez Vega, Madrid (ES); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 314 days.

(21) Appl. No.: 17/632,535

(22) PCT Filed: Sep. 6, 2019

(86) PCT No.: PCT/EP2019/073836
§ 371 (c)(1),
(2) Date: Feb. 3, 2022

(87) PCT Pub. No.: WO2021/023392
PCT Pub. Date: Feb. 11, 2021

(65) Prior Publication Data
US 2022/0286904 A1  Sep. 8, 2022

(30) Foreign Application Priority Data

Aug. 6, 2019 (EP) .................................... 19382691

(51) Int. Cl.
*H04W 28/02* (2009.01)
*H04L 47/193* (2022.01)
*H04W 40/02* (2009.01)

(52) U.S. Cl.
CPC ....... *H04W 28/0289* (2013.01); *H04L 47/193* (2013.01); *H04W 28/0263* (2013.01); *H04W 28/0268* (2013.01); *H04W 40/02* (2013.01)

(58) Field of Classification Search
None
See application file for complete search history.

(56) References Cited

U.S. PATENT DOCUMENTS 9,992,088 B1 *  6/2018  Ho ....................... H04L 43/0835
2002/0089930 A1 *  7/2002  Aceves ................... H04L 47/32
370/235

(Continued)

FOREIGN PATENT DOCUMENTS

EP  2629554 A1  8/2013
WO  00 57666 A3  9/2000

OTHER PUBLICATIONS

Official Action issued by Intellectual Property India for Application No. 202217002307—Oct. 26, 2023.
(Continued)

*Primary Examiner* — Eunsook Choi
(74) *Attorney, Agent, or Firm* — Baker Botts L.L.P.

(57) ABSTRACT

A technique for handling data traffic in a core network domain of a communication network is described. An apparatus comprised by the technique is configured to be located in the core network domain and to receive data traffic sent under control of a transport layer protocol that is configured to apply a congestion control algorithm, CCA. The apparatus is further configured to analyze the data traffic to obtain a data traffic analyzation result, to obtain, based on the analyzation result, CCA information about the CCA that can be or is applied by the transport layer protocol, and to perform a traffic handling action for the data traffic taking into account the obtained CCA information.

20 Claims, 11 Drawing Sheets

(56) References Cited

U.S. PATENT DOCUMENTS

| | | | |
|---|---|---|---|
| 2005/0135252 A1* | 6/2005 | Singh | H04L 69/163 |
| | | | 370/236 |
| 2014/0233390 A1* | 8/2014 | Schmid | H04W 28/0289 |
| | | | 370/236 |
| 2016/0330647 A1* | 11/2016 | Iwai | H04L 12/1407 |
| 2017/0303159 A1 | 10/2017 | Ma et al. | |
| 2019/0182170 A1* | 6/2019 | Kulkarni | H04L 47/11 |
| 2019/0253364 A1* | 8/2019 | Li | H04L 47/2441 |
| 2023/0246966 A1* | 8/2023 | Sun | H04L 47/125 |
| | | | 370/235 |

OTHER PUBLICATIONS

3GPP TS 29. 522 v15.2.0; Technical Specification; 3rd Generation Partnership Project; Technical Specification Group Core Network and Terminals; 5G System; Network Exposure Function Northbound APIs; Stage 3 (Release 15)—Dec. 2018.

PCT International Search Report issued for International application No. PCT/EP2019/073836—Apr. 8, 2020.

PCT Written Opinion of the International Searching Authority issued for International application No. PCT/EP2019/073836—Apr. 8, 2020.

Examination Report issued by the Intellectual Property India for Application No. 202217002307—May 20, 2022.

* cited by examiner

TECHNIQUE FOR CONTROLLING AND PERFORMING DATA TRAFFIC HANDLING IN A CORE NETWORK DOMAIN

PRIORITY

This nonprovisional application is a U.S. National Stage Filing under 35 U.S.C. § 371 of International Patent Application Serial No. PCT/EP2019/073836 filed Sep. 6, 2019 and entitled "TECHNIQUE FOR CONTROLLING AND PERFORMING DATA TRAFFIC HANDLING IN A CORE NETWORK DOMAIN" which claims priority to U.S. European Patent Application No. 19382691.4 filed Aug. 6, 2019 both of which are hereby incorporated by reference in their entirety.

TECHNICAL FIELD

The present disclosure generally relates to controlling and performing data traffic handling in a core network domain of a communication network. In more detail, the disclosure relates to apparatuses in the core network domain that are configured to handle data traffic and to control data traffic handling, respectively, to an apparatus outside the core network domain configured to send data traffic to be handled in the core network domain, to corresponding methods and to a computer program product.

BACKGROUND

Many communication networks have an access network domain and a core network domain. The access network domain may comprise network nodes such as base stations that provide wireless network access to terminal devices (e.g., smartphones, tablet computers and Internet of Things (IoT) devices). Among many other things, the core network domain is in charge of connecting the terminal devices served by the access network domain to other networks. Such other networks include the Internet or content provider networks that provide, often via the Internet, streaming services. Typical streaming services include video streaming (e.g., Netflix® or YouTube®) or audio streaming (e.g., Spotify® or Deezer®).

Wireless data traffic is constantly increasing, mostly due to streaming services being more and more consumed via wireless terminal devices. To cope with the resulting increase of data traffic in the core network domain, certain traffic handling actions are applied in the core network domain for traffic optimization (e.g., traffic acceleration).

The traffic handling actions applied in the core network domain can be fine-tuned based on measurements or estimations of certain characteristics of the incoming data traffic. These characteristics can be indicative of how connectivity performance influences user experience, for example in terms of Quality of Experience (QoE). Also the influence on content delivery from the perspective of the application can be of interest, for example if a guaranteed Quality of Service (QoS) can be met.

Measurements or estimations fir determining data traffic characteristics are becoming more and more difficult as most data traffic is being encrypted. Moreover, the endpoints of the data traffic often apply higher-layer traffic handling actions that are transparent for the core network domain but nonetheless potentially influence the traffic handling actions applied in the core network domain.

SUMMARY

There is a need for a technique that provides an efficient data traffic handling and an efficient data traffic handling control for a core network domain.

According to a first aspect, an apparatus for handling data traffic in a core network domain of a communication network is provided. The apparatus is configured to be located in the core network domain and to receive data traffic sent under control of a transport layer protocol that is configured to apply a congestion control algorithm (CCA). The apparatus is further configured to analyze the data traffic to obtain a data traffic analyzation result; to obtain, based on the analyzation result, CCA information about the CCA that can be or is applied by the transport layer protocol; and to perform a traffic handling action for the data traffic taking into account the obtained CCA information.

The obtained CCA information may specifically identify the CCA that can be or is applied by the transport layer protocol (e.g., by a name or other identifier assigned to the CCA). The obtained CCA information may be indicative of a generic CCA type of the CCA that can be or is applied by the transport layer protocol. The generic CCA type may be indicative of a data traffic-related metric used as a congestion indicator by the CCA. The data traffic-related metric can be selected from a metric set including data rate, data delay, data packet loss, and any combination thereof.

The data traffic may be comprised of data packets. The apparatus may be configured to obtain the analyzation result by subjecting the data traffic to packet inspection. The packet inspection may be performed using deep packet inspection (DPI) or shallow packet inspection (SPI) technologies.

The analyzation result may identify an application generating the data traffic. This application may be running on a terminal device, in a content provider system (e.g., on an application server or application function), or both on the terminal device and in the content provider system. The data traffic received by the apparatus of the first aspect may thus be generated by the terminal device, by the content provider system, or by both, the terminal device and the content provider system.

As an example, the analyzation result may be a name or abstract identifier of the application. Additionally, or in the alternative, the analyzation result may identify a data flow of an application session in which the data traffic is generated. As an example, the data flow may be identified its associated 5-tuple (source address, source port, destination address, destination port, transport layer protocol).

The CCA information may be obtained from a mapping that associates the analyzation result with the CCA information. The mapping may take the form of a data set comprising both the analyzation result and the associated CCA information. In some variants, the mapping has been configured in the core network domain by a sender of the data traffic located outside the core network domain. As an example, the data traffic sender may be operated by or on behalf of a content provider. The data traffic sender may provide the data traffic in the form of a media stream (e.g., in the form of a video stream or an audio stream).

The apparatus may be configured to receive the mapping or a portion thereof (e.g., the CCA information) in a session establishment request or a session modification request. As an example, the corresponding request may include a data set comprising both the analyzation result and the associated CCA information.

In some implementations, the mapping is defined by an association between a packet detection rule (PDR) and a quality of service enforcement rule (QER), received by the apparatus, wherein the PDR is indicative of a potential analyzation result and the QER is indicative of the CCA information mapped to the potential analyzation result. In other implementations, the mapping is defined by a PDR and a packet forwarding control protocol, PFCP, information element, wherein the PDR is indicative of a potential analyzation result and the PFCP information element is indicative of the CCA information mapped to the analyzation result.

The apparatus may be configured to select a traffic handling rule dependent on the obtained CCA information. The traffic handling rule may in particular define the traffic handling action. In some cases, the traffic handling action may result in the data traffic consuming less bandwidth in an access network domain of the communication network.

The apparatus may be configured as one of a user plane function (UPF) of a $5^{th}$ Generation (5G) core network domain, a user plane packet gateway (PGW-U) of a $4^{th}$ Generation (4G) core network domain, and a user plane traffic detection function (TDF-U) of a 4G core network domain.

According to a second aspect, an apparatus configured to control handling of data traffic in a core network domain of a communication network is provided, wherein the core network domain is configured to apply a traffic handling action to the data traffic taking into account a CCA that can be or is applied by a transport layer protocol controlling the data traffic. The apparatus is configured to be located in the core network domain and to receive a mapping that associates the data traffic with CCA information about the CCA that can be or is applied by the transport layer protocol. The apparatus is further configured to enable triggering of a traffic handling action for the data traffic in accordance with the CCA information.

In all the apparatus aspects presented herein, the data traffic may comprise a data flow of an application session in which the data traffic is generated. The data flow may comprise a stream of video data or audio data. In such an implementation, the mapping may associate the data flow with the CCA information. Moreover, the apparatus of the second aspect may receive the mapping after the application session has been established or during establishment of the application session.

The apparatus of the second aspect may forward the mapping to a core network entity in charge of applying the traffic handling action to the data traffic so as to enable triggering of the traffic handling action. This core network entity may be the apparatus according to the first aspect.

In all the apparatus aspects presented herein, the data traffic may be generated by an application. The application may be located outside the core network domain. The application may generate a stream of video data or audio data. The mapping may associate the application with the CCA information. The application may be an OTT application running on an application server or an application function. The application server or application function may be realized as a host server. In such an implementation, the apparatus of the second aspect may in particular receive the mapping or a portion thereof before an application session involving the application is established. The apparatus of the second aspect may forward the mapping to a data repository from which the mapping or portion thereof can be retrieved upon establishment of the data session.

The apparatus of the second aspect may in particular be configured to retrieve the mapping or a portion thereof (e.g., the CCA information) from the data repository during or in response to establishment of the application session. In some variants, the apparatus of the second aspect may forward the retrieved mapping or the retrieved portion thereof to a core network entity in charge of applying the traffic handling action to the data traffic so as to enable triggering of the traffic handling action after the application session has been established. This core network entity may be the apparatus according to the first aspect.

The apparatus of the second aspect may receive the mapping from a data traffic sender located outside the core network domain. In other variants, the apparatus of the second aspect may receive the mapping from a core network entity. This core network entity may interface with the data traffic sender that is located outside the core network domain.

The apparatus of the second aspect may be configured as one of a network exposure function (NEF) of a 5G core network domain, a session management function (SMF) of a 5G core network domain, a service capability exposure function (SCEF) of a 4G core network domain, a control plane packet gateway (PGW-C) of a 4G core network domain, and a control plane traffic detection function (TDF-C) of a 4G core network domain.

According to a third aspect, an apparatus configured to send data traffic in accordance with a transport layer protocol that enables application a CCA is provided. The data traffic is to be routed through a core network domain of a communication network, wherein the core network domain is configured to perform a traffic handling action for the data traffic taking into account the CCA. The apparatus is configured to be located outside the core network domain and to obtain a mapping that associates the data traffic with CCA information about the CCA that can be or is applied by the transport layer protocol; to send the mapping to the core network domain so as to enable triggering of a traffic handling action for the data traffic in accordance with the CCA information; and to send the data traffic to the core network domain.

The data traffic may comprise a data flow of an application session in which the data traffic is generated, and the mapping may associate the data flow with the CCA information. In such a case, the mapping may be sent after the application session has been established or during establishment of the application session.

The data traffic may be generated by an application and the mapping may associate the application with the CCA information. In such a case, the mapping may be sent before an application session involving the application is established.

The apparatus of the third aspect may be configured to be operated by or on behalf of a content provider. In all the apparatus and method aspects presented herein, the data traffic may be over-the-top, OTT, data traffic.

The apparatus of the third aspect may be an application function, AF, of a 5G core network domain. Alternatively, it may be a service capability server/application server (SCS/AS) of a 4G core network domain.

Also provided is a core network domain system comprising the apparatus of the first aspect and the apparatus of the second aspect. Further provided is a network system comprising the apparatus of the third aspect and at least one further apparatus selected from the apparatus of the first aspect and the apparatus of the second aspect.

Also provided is a method of handling data traffic in a core network domain of a communication network, the method comprising the following steps performed in the core network domain: receiving data traffic sent under control of a transport layer protocol that is configured to apply a CCA; analyzing the data traffic to obtain a data traffic analyzation result; obtaining, based on the analyzation result, CCA information about the CCA that can be or is applied by the transport layer protocol; and performing a traffic handling action for the data traffic taking into account the obtained CCA information. This method may be performed by the apparatus of the first aspect, the core network domain system or the network system.

Further provided is a method of controlling handling of data traffic in a core network domain of a communication network, wherein the core network domain is configured to apply a traffic handling action to the data traffic taking into account a CCA that can be or is applied by a transport layer protocol controlling the data traffic, the method comprising the following steps performed in the core network domain receiving a mapping that associates the data traffic with CCA information about the CCA that can be or is applied by the transport layer protocol; and enabling triggering of a traffic handling action for the data traffic in accordance with the CCA information. This method may be performed by the apparatus of the second aspect, the core network domain system or the network system.

Moreover, a method is provided of sending data traffic in accordance with a transport layer protocol that enables application of a CCA, wherein the data traffic is to be routed through a core network domain of a communication network, wherein the core network domain is configured to perform a traffic handling action for the data traffic taking into account the CCA, the method comprising the followings steps performed outside the core network domain: obtaining a mapping that associates the data traffic with CCA information about the CCA that can be or is applied by the transport layer protocol; sending the mapping to the core network domain so as to enable triggering of a traffic handling action for the data traffic in accordance with the CCA information; and sending the data traffic to the core network domain. This method may be performed by the apparatus of the third aspect or the network system.

Also provided is a computer program product comprising program code portions configured to perform the method presented herein when the computer program product is executed by one or more processors. The computer program product may be stored on a computer readable recording medium or may be provided for download via a network connection.

Further provided is a method implemented in a system including a traffic sender (e.g., an application server or application function) operated by or on behalf of a content provider, a core network domain and a terminal device, the method comprising, at the traffic sender, providing data traffic for the terminal device; and, at the traffic sender, initiating a transmission carrying the data traffic to the terminal device via the core network domain, wherein the core network domain is configured to receive the data traffic, wherein the data traffic is sent under control of a transport layer protocol that is configured to apply a CCA. The core network domain is configured to analyze the data traffic to obtain a data traffic analyzation result; to obtain, based on the analyzation result, CCA information about the CCA that can be or is applied by the transport layer protocol; and to perform a traffic handling action for the data traffic taking into account the obtained CCA information.

The method may further comprise, in the core network domain, sending the data traffic to the terminal device. The data traffic may be provided at the traffic sender operated by or on behalf of a content provider by executing a host application. The method may further comprise, at the terminal device, executing a client application associated with the host application.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
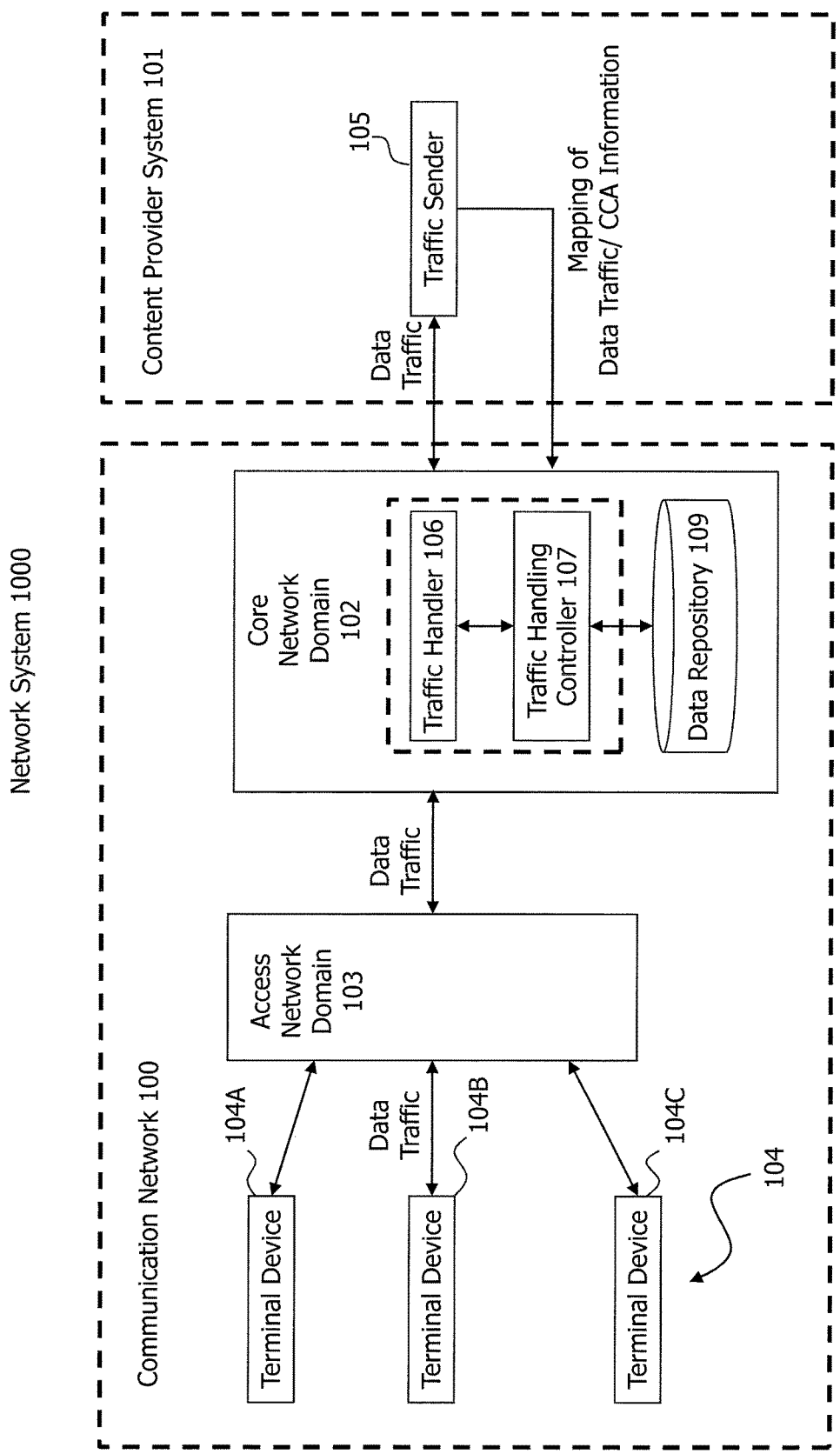
FIG. 1 is a diagram illustrating a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on an exemplary core network configuration in accordance with 5G specifications, the present disclosure is not limited in this regard. The present disclosure could also be implemented in other cellular or non-cellular wireless communication networks having a core network domain, such as those complying with 4G specifications.

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a network system 1000 in which the present disclosure can be implemented. As shown in FIG. 1, the network system 1000 comprises a communication network 100 operated by a network operator. The communication network 100 may be a mobile (e.g., a cellular) communication network. The network system 1000 further comprises a content provider system 101 operated by a content provider (sometimes also called service provider).

As shown in FIG. 1, the communication system 100 comprises a core network domain 102 and an access network domain 103. In some realizations, each of these domains comprises a user plane for transporting data traffic and a control plane for transporting control signaling.

Different terminal devices 104, such as a user equipment-(UE-) type terminal device 104A (e.g., a smartphone) and two IoT-type terminal devices 104B, 104C (e.g., a car and a wearable device), are serviced by the core network domain 102 via the access network domain 103 (e.g., an access point or a base station thereof). These terminal devices are collectively denoted by reference numeral 104.

The services provided by the core network domain 102 include transporting data traffic between the content provider system 101 and the terminal devices 104. Additionally, these services include data traffic handling so as to optimize the data traffic transport. An exemplary data traffic optimization will reduce the bandwidth consumed by the data traffic to be transported through the access network domain 103.

The data traffic routed transported through the core network domain 102 will primarily be generated by a traffic sender 105 in the content provider system 101. It will be appreciated that any of the terminal devices 104 could likewise function as a sender of data traffic (e.g., when uploading video or audio data). In such a case the corresponding terminal device 104 will take the role of the traffic sender 105, so that the observations herein on the traffic sender 105 will also apply to the corresponding terminal device 104.

In some variants, the traffic sender 105 is configured to execute an OTT application (such as YouTube®, Netflix®, Spotify® or Deezer®). Such an OTT application typically generates OTT data traffic in the form of video data or audio data (typically in a session context). The OTT data traffic can take the form of one or more OTT data flows.

The core network domain 102 comprises multiple network entities. In FIG. 1, primarily the network entities participating in data traffic handling are illustrated. Those network entities comprise a traffic handler 106 and a traffic handling controller 107. The traffic handler 106 and the traffic handling controller 107 may be implemented as separate core network entities or integrated into one single core network entity (as illustrated in FIG. 1 by dashed lines).

The traffic handling controller 107 is configured to enable the triggering of a traffic handling action (e.g., application of a traffic handling rule) by the traffic handler 106. This traffic handling action may be performed in a session context involving one of the terminal devices 104 and the content provider system 101.

The traffic handling controller 107 is specifically configured to control the traffic handler 106 based on a mapping between data traffic (e.g., as generated by a particular application or transported in a particular data flow of a particular application) on the one hand and, on the other hand, information pertaining to a congestion control algorithm (CCA) that is or can be applied by a transport layer protocol running on the data traffic endpoints (i.e., one of the terminal devices 104 and the traffic sender 105).

As illustrated in FIG. 1, the mapping is received by the traffic handling controller 107 from the content provider system 101 (e.g., from the traffic sender 105 or some other entity in the content provider system 101). The mapping will in some implementations be stored by the traffic handling controller 107 in a (e.g., central) data repository 109 of the core network domain 102 for later retrieval. In other implementations, the mapping may directly be forwarded by the traffic handling controller 107 to the traffic handler 106 without being stored in a dedicated data repository.

Various transport layer protocols can be used on Layer 4 of the Open Systems Interconnection (OSI) model for communication between the traffic sender 105 and each of the terminal devices 104. For example, the transmission control protocol (TCP) has for a long time been the dominant transport layer protocol on the Internet. It supports the necessary procedures to enable a reliable and congestion-controlled delivery of data traffic.

As the Internet and its applications grow more complex, so do the requirements on zo the transport layer protocols. A new protocol, Quick UDR Internet Connections (QUIC), is emerging with the intention to replace TCP. QUIC retains the properties of TCP with reliable and congestion-controlled data traffic delivery but provides richer signaling between endpoints (here: the terminal devices 104 and the traffic sender 105), improved support for multiple data streams and more security. While QUIC has improved mechanisms for accurate congestion estimation and detection and recovery of packet loss, the congestion control fundamentals remain the same as for TCP. QUIC is version based, will run both in operating systems and application user space, and it is expected will support a larger set of CCAs compared to TCP.

Other common transport protocols such as WebRTC are used to deliver real-time streaming media. WebRTC uses two parallel channels, one real time transport protocol-(RTP-) based channel that is not directly congestion controlled and one data traffic channel that contains feedback between the endpoints. The feedback from the endpoints regulates, for example, operations of a media encoder and media resolution.

Congestion control is a necessary component of many transport layer protocols. The aim of congestion control is to ensure that a particular data traffic connection does not become congested, or to ensure that the connection does not remain in a congested state if congestion occurs. Congestion control is implemented by CCAs. CCAs are typically implemented at the sender side only and do not require any specific protocol support (there exist algorithms that require both sender and receiver side support, but they are generally not deployed on the Internet). What differentiates different CCAs is, inter alia, the data traffic-related parameter they use to infer congestion, how they implement their response to congestion and how they probe for bandwidth.

Classic congestion control uses packet loss as an indicator of congestion and typically implements an additive increase multipliable decrease (AIMD) model. An AIMD model increases its congestion window (CWIN) linearly until a congestion event is detected, at which point it reduces the CWIN by a multiplicative factor. The most common AIMD algorithm is (New) Reno. Another common loss-based CCA is CUBIC which increases the CWIN as a cubic function with an infliction point around the window size of the most recent loss event. Other CCAs use delay and bitrate measurements to control the sending rate and congestion response. These CCAs tend to be more proactive in mitigating congestion and also work better in networks in which packet loss happens for other reasons than congestion.

The following table summarizes some aspects of exemplary CCAs that can be used in exemplary embodiments. In more detail, the table indicates the congestion indicator (generic CCA type) used by a particular CCA. The generic CCA type is thus indicative of a data traffic-related metric (e.g., packet loss or delay) used by the particular CCA as the congestion indicator. The table further shows the benefits of the corresponding CCA and the fairness thereof.

| CCA name | CCA type | Benefits | Fairness |
|---|---|---|---|
| (New) Reno | Loss | — | Delay |
| Vegas | Delay | Less loss | Proportional |
| High Speed | Loss | High bandwidth | |
| BIC | Loss | High bandwidth | |
| CUBIC | Loss | High bandwidth | |
| H-TCP | Loss | High bandwidth | |
| FAST | Delay | High bandwidth | Proportional |
| Compound TCP | Loss/Delay | High bandwidth | Proportional |
| Westwood | Loss/Delay | | |
| Jersey | Loss/Delay | | |
| BBR | Delay | BLVC, Bufferbloat | |

The traffic handler 106 is configured to apply different types of traffic handling actions (e.g., different traffic handling rules) depending on the CCA information that has been obtained via the traffic handling controller 107 from the content provider system 101 for data traffic generated by a particular application or transported in a particular data flow. Such actions include traffic optimization (e.g., traffic acceleration), for example based on splitting or manipulating traffic or shaping of data flows so that they consume less bandwidth in the possibly congested access network domain 103.

Such traffic handling actions are becoming more and more critical because of the increasing data traffic volume. For example, traffic handling actions like TCP optimization in the core network domain 102 aim to fix link inefficiency and QoE degradation that arise when loss-based TCP interacts with layer 2 protocols of the access network domain 103, such as one or more of packed data convergence protocol (PDCP), radio link control (RLC) and medium access control (MAC), which run their own flow control and error recovery mechanisms. The traffic handling actions in the core network domain 102 are performed based on knowledge about the CCA (e.g., its CCA type) used or usable for particular data traffic. The corresponding CCA information obtained by the traffic handler 106 determines the underlying traffic optimization problem statement and can be fined tuned through measurements or estimations of certain characteristics from the incoming data traffic.

The traffic optimization problem statement is in some implementations defined by the combination of the following three parameters {application target QoS, CCA information about the selected CCA, actual radio configuration serving}. The parameter "application target QoS" is an indicator of a connectivity service level that may be required by or guaranteed to a particular application. The parameter "actual radio configuration serving" is related to, for example, a radio bearer type in use and/or a cellular access configuration carrying the data traffic. By additionally considering the CCA information parameter (e.g., the CCA type of the selected CCA) in the optimization process that will eventually yield a particular traffic handling action (e.g., selection of a particular traffic handling rule), the efficiency of the traffic handling action as such will be increased. This increased efficiency will also be experienced by the terminal devices 104 as QoE enhancements and by the application as QoS enhancements.

In the following, apparatus embodiments of the traffic sender 105, the traffic handler 106 and the traffic handling controller 107 will be described with reference to FIGS. 2A and 2B, 3A and 3B as well as 4A and 4B, respectively. Also, operations of the apparatus embodiments will be described with reference to corresponding method embodiments illustrated in flow diagrams 500, 525, 550 of FIGS. 5A and 5B, respectively.

Figure 2B:
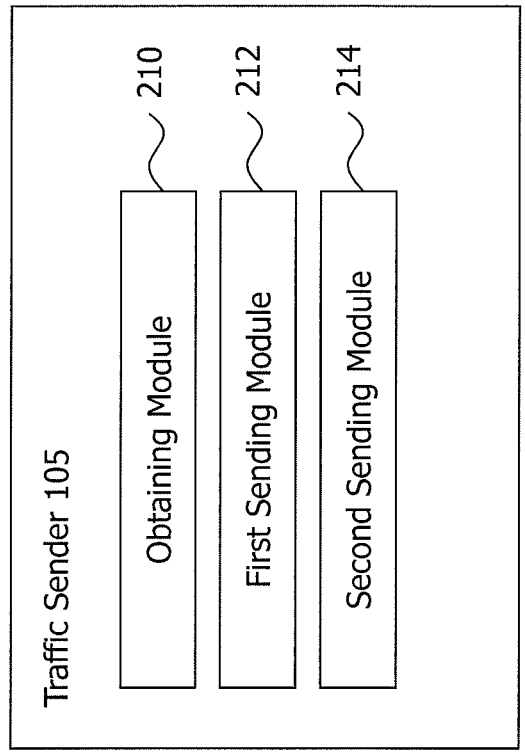
FIGS. 2A, 2B are block diagrams illustrating apparatus embodiments of two data traffic senders in accordance with the present disclosure.
Figure 2A:
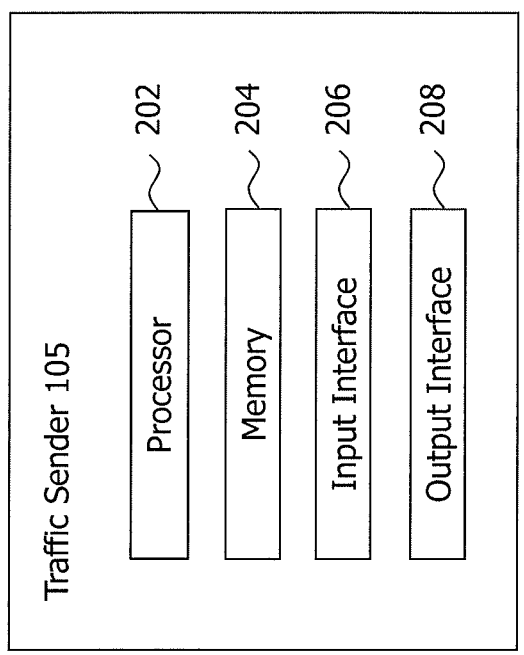

FIGS. 2A and 2B illustrate two embodiments of the traffic sender 105 of FIG. 1. In the embodiment illustrated in FIG. 2A, the traffic sender 105 comprises a processor 202 and a memory 204 coupled to the processor 202. The traffic sender 105 further comprises an optional input interface 206 and an optional output interface 208. The memory 204 stores program code that controls operation of the processor 202.

As understood herein, a processor, such as the processor 202, may be implemented using any processing circuitry and is not limited to, for example, a single processing core but may also have a distributed topology.

Figure 5A:
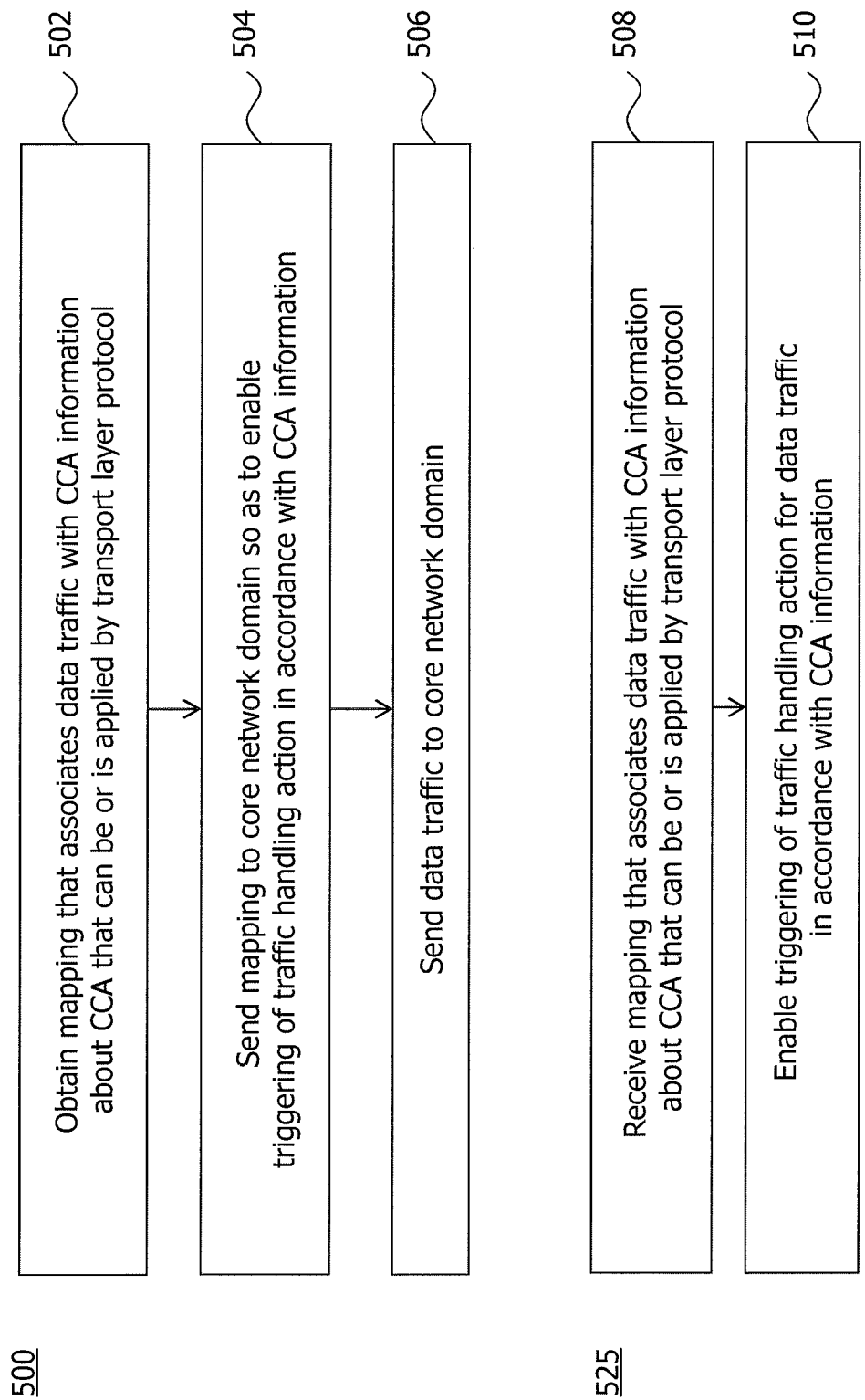
FIGS. 5A, 5B illustrate flow diagrams of three method embodiments of the present disclosure.

The processor 202 of the traffic sender 105 is configured to obtain, for example via the input interface 206 or by a processing operation, a mapping that associates ongoing or upcoming data traffic with CCA information about the CCA that can be or is applied by a transport layer protocol for the data traffic (see step 502 in FIG. 5A). The mapping may take the form of a data set associating the CCA information (e.g., a generic CCA type or a particular CCA identifier) with data traffic for which the corresponding CCA will be applied. That data traffic may be identified in the data set by an identifier of an application generating the data traffic or an identifier of a data flow transporting the data traffic. In some variants, the processor 202 is configured to define the transport layer protocol and the CCA information (and, thus, the mapping therebetween) based on one or both of information locally available to the processor 202 and information received by the processor 202 from within the content provider system 101.

The processor 202 is further configured to control sending, for example via the output interface 208, of the mapping to the core network domain 102 so as to enable triggering of a traffic handling action by the traffic handler 106 for the data traffic in accordance with the CCA information (see step 504 in FIG. 5A). As an example, the mapping is sent to the traffic handling controller 107 in the core network domain 102. Based on the mapping, the traffic handling controller 107 may then enable the traffic handler 106 to trigger the traffic handling action.

The processor 202 is also configured to control sending, for example via the output interface 208 or otherwise, of the data traffic to the core network domain 102 in accordance with (e.g., under control of) the transport layer protocol (see step 506 in FIG. 5A). As an example, the processor 202 may apply TCP, QUIC or any other transport layer protocol that is configured to apply a CCA (see, e.g., the table above). The data traffic will in some variants be sent in the context of an application session involving one of the terminal devices 104 and the traffic sender 105. The two sending steps 504 and 506 may be performed in any order and also concurrently.

FIG. 2B shows an embodiment in which the traffic sender 105 is implemented in a modular configuration (e.g., using a computing cloud). As shown in FIG. 2B, the traffic sender 105 then comprises an obtaining module 210 configured carry out step 502, a first sending module configured to carry out step 504, and a second sending module 214 configured to carry out step 506 of flow diagram 500 as illustrated in FIG. 5A.

Figure 3B:
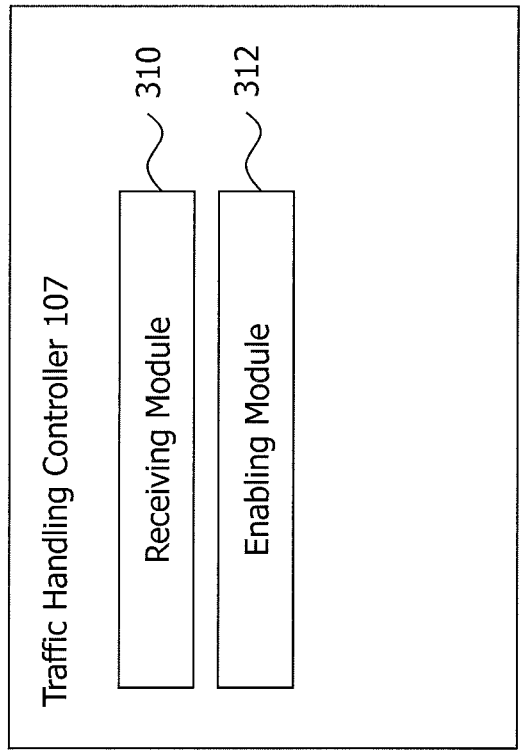
FIGS. 3A, 3B are block diagrams illustrating apparatus embodiments of two traffic handling controllers in accordance with the present disclosure.
Figure 3A:
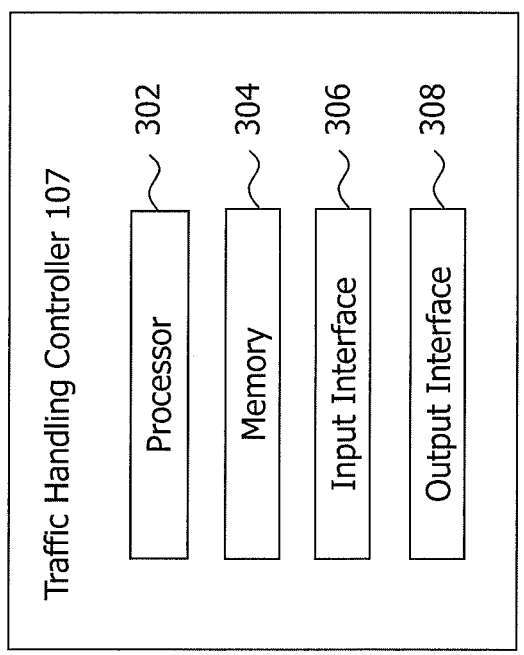

FIGS. 3A and 3B illustrate two embodiments of the traffic handling controller 107 of FIG. 1. In the embodiment illustrated in FIG. 3A, the traffic handling controller 107 comprises a processor 302 and a memory 304 coupled to the processor 302. The traffic handling controller 107 further comprises an optional input interface 306 and an optional output interface 308. The memory 304 stores program code that controls operation of the processor 302.

The processor 302 of the traffic handling controller 107 is configured to receive from the traffic sender 105 the mapping that associates the (upcoming or ongoing) data traffic with CCA information about the CCA that can be or is applied by the transport layer protocol that is or will be running on the traffic sender 105, see step 508 of FIG. 5A. As explained above, that mapping has been sent by the traffic sender in step 504 of FIG. 5A and may be received by the processor 302 via the input interface 306.

The processor 302 is further configured to enable triggering of a traffic handling action by the traffic handler 106 for the data traffic in accordance with the CCA information mapped to that data traffic, see step 510 of FIG. 5A. To this end, the processor 302 may output the mapping, or at least the CCA information, to the traffic handler 106 via the output interface 308. The mapping, or at least the CCA information, may be output either directly to the traffic handler 106 upon receipt by the processor 302 (e.g., in a push manner) or may first be stored in the data repository 109 for being retrieved later and output to the traffic handler 106 upon a dedicated request (e.g, in a pull manner). By outputting the CCA information either individually or as the complete mapping to the traffic handler 106, the traffic handler 106 is enabled to trigger a traffic handling action for the data traffic associated with the CCA information.

FIG. 3B shows an embodiment in which the traffic handling controller 107 is implemented in a modular configuration (e.g., using a computing cloud). As shown in FIG. 3B, the traffic handling controller 107 comprises a receiving module 310 configured carry out step 508 and an enabling module 312 configured to carry out step 510 of flow diagram 525 as illustrated in FIG. 5A.

Figure 4B:
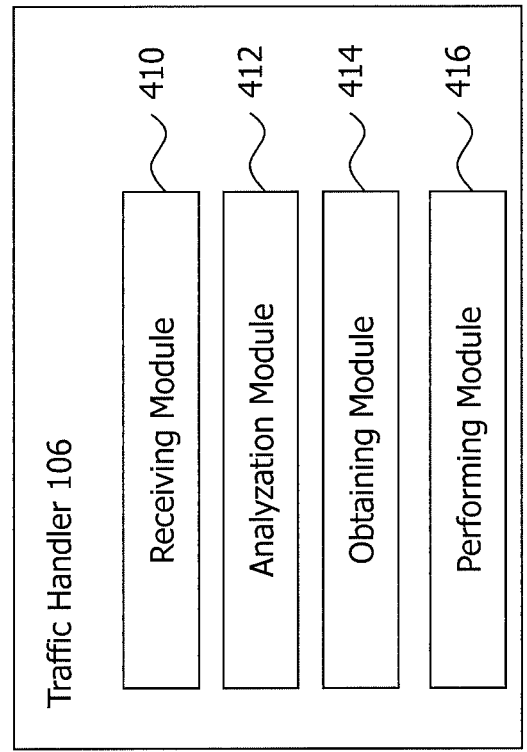
FIGS. 4A, 4B are block diagrams illustrating apparatus embodiments of two traffic handlers in accordance with the present disclosure.
Figure 4A:
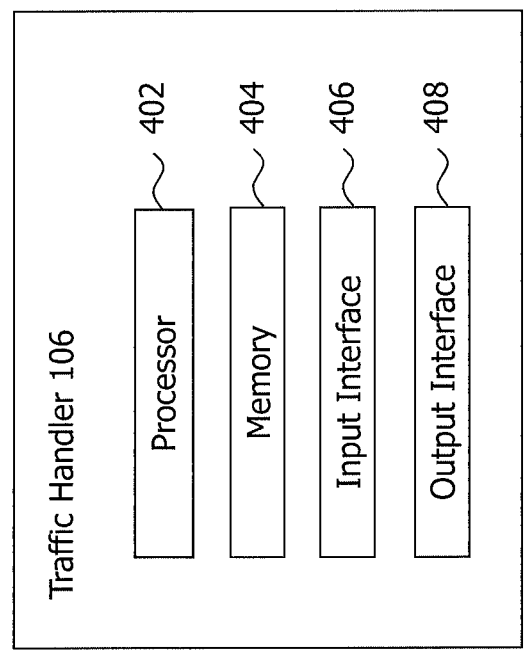

FIGS. 4A and 4B illustrate two embodiments of the traffic handler 106 of FIG. 1. In the embodiment illustrated in FIG. 4A, the traffic handler 106 comprises a processor 402 and a memory 404 coupled to the processor 402. The traffic handler 106 further comprises an optional input interface 406 and an optional output interface 408. The memory 404 stores program code that controls operation of the processor 402.

Figure 5B:
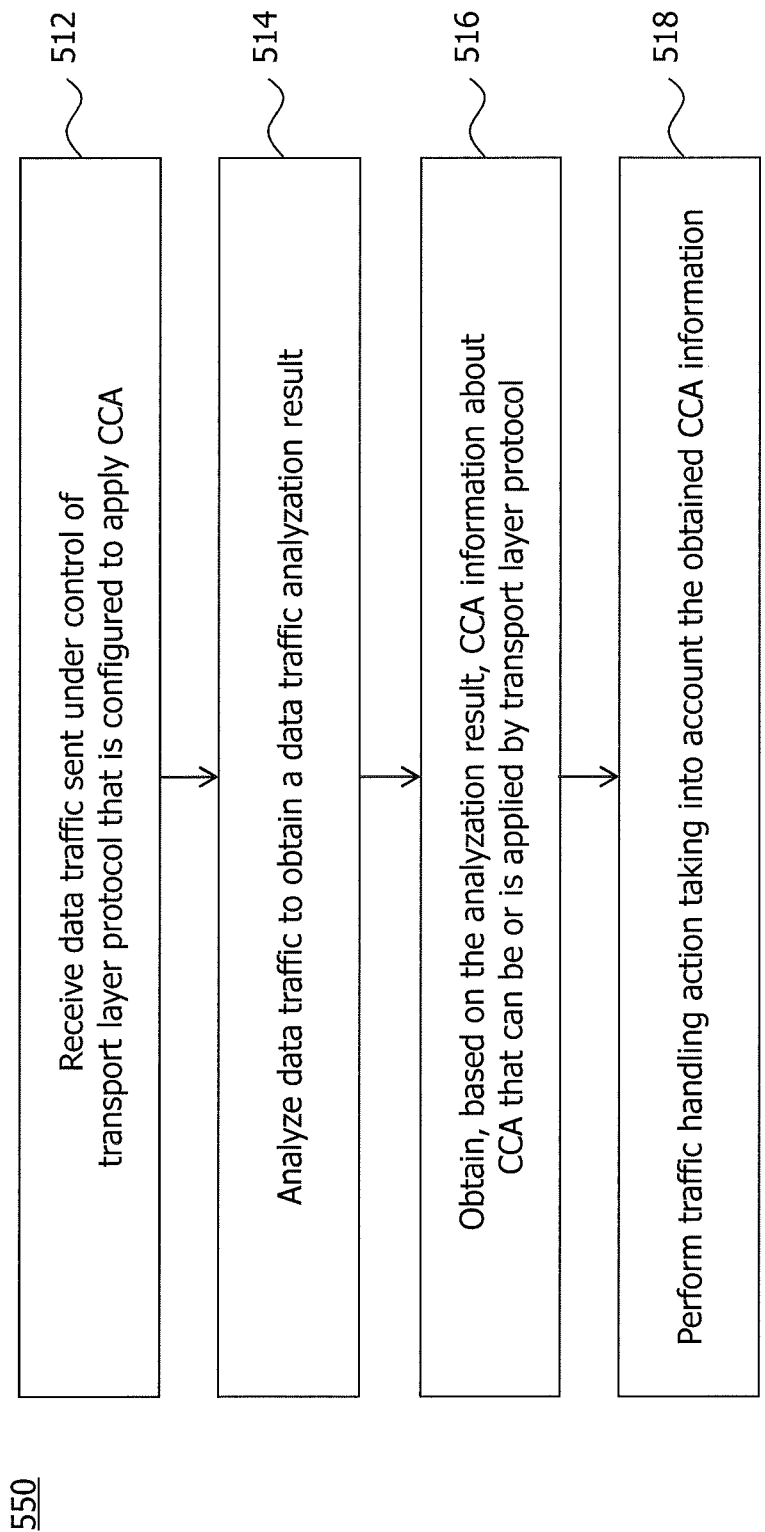

The processor 402 of the traffic handler 106 is configured to receive data traffic sent by the traffic sender 105 under control of a transport layer protocol that is configured to apply a CCA (see step 512 of flow diagram 550 in FIG. 5B and step 506 of flow diagram 500 of FIG. 5A). The data traffic may be received via the input interface 406. The data traffic may bypass the traffic handling controller 107.

The processor 402 is further configured to analyze the received data traffic to obtain a data traffic analyzation result (step 514 in FIG. 5B). The analysis may comprise a deep-level inspection of data packets constituting the data traffic so as to determine an application running on the traffic sender 105 and generating the data traffic. Alternatively, or in addition, the analysis may comprise a shallow-level inspection of data packets constituting the data traffic so as to determine a data flow in which the data packets are transported and that emanates from the traffic sender 105. Consequently, the analyzation result may take the form of one or both of an application identifier, such as an abstract identifier or a name of the application, and a flow identifier, such as a 5-tuple defining the flow. The 5-tuple as derived from a particular data packet contains its source Internet Protocol (IP) address, its source port, its destination IP address, its destination port, and an identifier of the transport layer (i.e., layer 4) protocol, such as:

"191.168.124.100/50271/181.209.179.69/80/6"

for a data packet coming from port 50271 of IP address 1911.168.124.100, going to port 80 of IP address 181.209.179.69, using IP protocol 6, which is TCP.

In some cases, proxies in, for example, the core network domain 102 complement or overwrite the transport layer protocol parameter in the 5-tuple. As such, the transport protocol layer identifier in the 5-tuple is not necessarily indicative of the CCA that is actually used on the transport layer between the data traffic endpoints. Moreover, some transport layer protocols may be used with different CCAs, so that the mere knowledge of the transport layer protocol used between the endpoints does not yet allow the core network domain 102 do actually derive the CCA in use.

In some implementations, the data traffic analyzation involves the AF 105 operated by or on behalf of the content provider. As an example, the AF 105 may, for example, expose to the core network domain 102 certain data traffic detected by the processor 402 during the analyzation step is associated with a certain application running on the AF 105, so that the analyzation result is obtained from the detected data traffic and the associated information as exposed by the AF 105.

The processor 402 is configured to obtain, based on the analyzation result, CCA information about the CCA that can be or is applied by the transport layer protocol (step 516 in FIG. 5B). The CCA information is in one variant looked-up by the processor 402, using the analyzation result, from the mapping previously received from the traffic handling controller 107 and locally stored at the traffic handler 106. Alternatively, the processor 402 may specifically request the traffic handling controller 107 to signal the CCA information for the analyzation result. As such, the processor 402 may send the analyzation result in a request message to the traffic handling controller 107 and receive the CCA information in a response message from the traffic handling controller 107. The response message may either include the full mapping or, alternatively, only the CCA information, provided that corresponding state information is kept at the traffic handler 106.

The processor 402 is further configured to perform a traffic handling action for the data traffic (e.g., apply a traffic handling rule) taking into account the obtained CCA information, see step 518 in FIG. 5B. The traffic handling action performed by the processor 402 will thus somehow depend on the CCA information. If, for example, the CCA information is indicative of a generic type of the CCA (e.g., loss-based), the traffic handling action can be optimized taking into account the fact that a loss-based CCA is applied by the traffic sender 105 to the data traffic.

FIG. 4B shows an embodiment in which the traffic handler 106 is implemented in a modular configuration (e.g., using a computing cloud). As shown in FIG. 4B, the traffic handler 106 comprises a receiving module 410 configured carry out step 512, an analyzation module 412 configured to carry out step 514, an obtaining module 414 configured carry out step 516, and a performing module 416 configured to carry out step 518 of flow diagram 550 as illustrated in FIG. 5B.

The above general embodiments will now be described in greater detail with reference to certain technical specifications (TSs) defined by the 3rd Generation Partnership Project (3GPP) for 5G communication systems. 3GPP TS 23.501 V15.4.0 (2018-12) defines architectural aspects of a 5G service based architecture (SBA). According to this SBA, network functions (NF) use service-based interactions to consume services from other NFs. The discovery of services and of NFs producing them is provided by a network repository function (NRF). Service producing NFs register, update or deregister their profiles in the NRF. Service consuming NFs discover services offered by NF producer instances by querying the NRF about NF instances offering services of a given type. NFs may subscribe and unsubscribe to changes in the status of NFs registered in the NRF. Based on such subscriptions, the NRF will notify NFs of status changes of other NFs.

Figure 6:
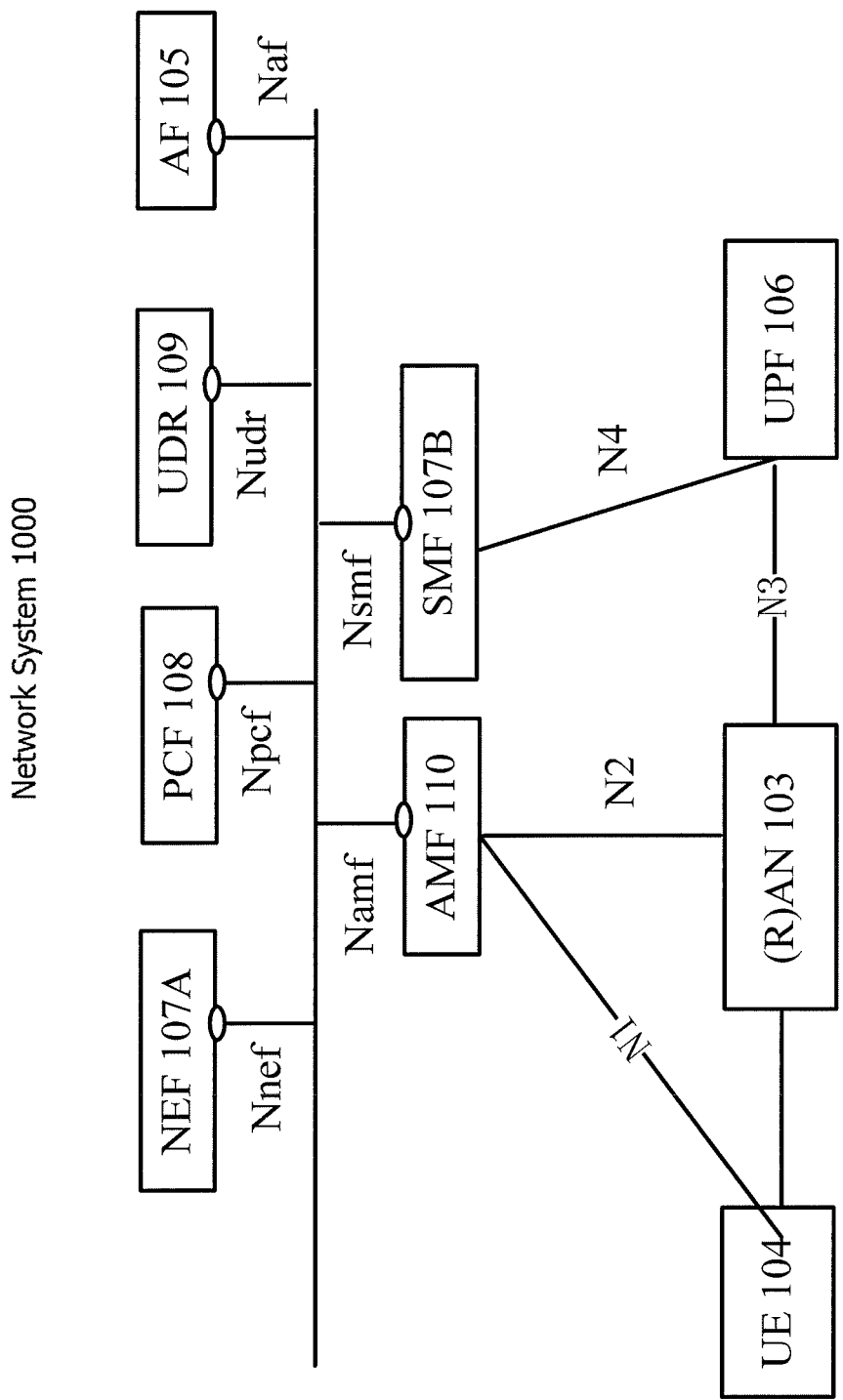
FIG. 6 is a diagram illustrating an exemplary 5G network architecture that can form the basis of embodiments of the present disclosure.

FIG. 6 depicts a portion of the 5G reference architecture as defined by 3GPP (see, e.g., Section 4.2.3 of 3GPP TS 23.501 V15.4.0). The relevant architectural core network entities (NFs) and core network interfaces for some embodiments include:

1) A user equipment (UE) 104 as an exemplary terminal device 104 (see FIG. 1). The UE 104 constitutes, for example, an endpoint of a video or audio streaming session that stretches via an access network domain 103, such as a (radio) access network, (R)AN.
2) An application function (AF) 105 that can be located outside the core network domain 102. The AF 105 is configured to interact with the core network domain 102 via an Naf interface. In the embodiments, the AF 105 takes the role of the data traffic sender 105 of FIG. 1 (e.g., in a video or audio streaming session with the UE 104). The AF 105 additionally provides the mappings that allow the core network domain 102 to trigger proper traffic handling actions for data traffic from certain applications and/or certain data flows.
3) A network exposure function (NEF) 107A has an Nnef interface and supports different functionality. Specifically, in the context of the embodiments, the NEF 107A acts as an entry point into the core network domain 102 and may take the role of the traffic handling controller 107 of FIG. 1. The AF 105 outside the core network domain 102 interacts with the core network domain 102 through the NEF 107A.
4) A session management function (SMF) 107B has an Nsmf interface. In the embodiments, the SMF 107B receives PCC rules from a policy control function (PCF) 108 and configures a user plane function (UPF) 106 accordingly. In the context of the embodiments, also the SMF 107B may take the role of the traffic handling controller 107 of FIG. 1
5) The user plane function (UPF) 106 has an N4 interface to the SMF 107B and an N3 interface to RAN 103. The UPF 106 supports handling of user plane data traffic based on the rules received from the SMF 107. Specifically, in the embodiments, the UPF 106 supports packet inspection in regard to the data traffic and the application of different traffic handling actions. As such, in the context of the embodiments, the UPF 106 may take the role of the traffic handler 106 of FIG. 1
6) The policy control function (PCF) 108 supports, via an Npcf interface, a unified policy framework to govern the core network domain behavior. Specifically, for the embodiments, the PCF 108 provides policy and charging control (PCC) rules to the PCEF (SMF 107B/UPF 106) that enforces policy and charging decisions according to the PCC rules provided by the PCF 108.
7) A unified data repository (UDR) 109 centrally stores data in the core network domain 102. In the context of the embodiments, the UDR 109 may take the role of the data repository 109 of FIG. 1.
8) An access and mobility management function (AMF) 110 handles access and mobility for the UE 104.

The following embodiments are based on an extension of the NEF's 107A Nnef interface by defining a new application programming interface (API) allowing a content provider operating or having operated the AF 105 to inform the core network domain 102 (via the NEF 107A) about the mapping between CCA information on the one hand and, on the other hand, a certain application and/or a certain application data flow in an application session involving the UE 104. Additional extensions can be made to one or more of the Npcf, Nudr, Nsmf and N4 interfaces, for example to forward the mapping to the UPF 106 that will use it to apply traffic handling actions (e.g., traffic optimization) for data traffic generated in the application session (e.g., on a per flow basis).

Figure 7A:
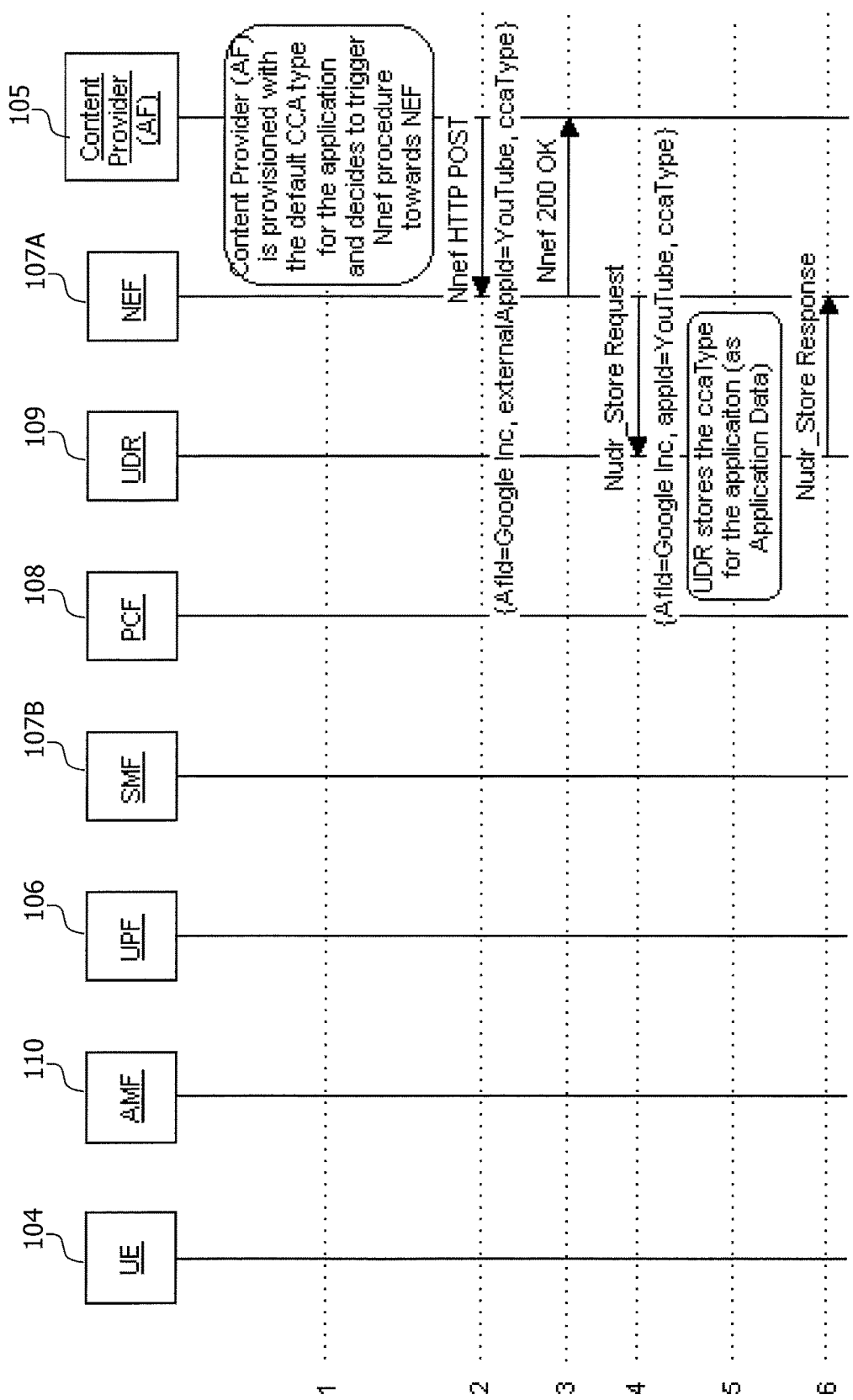
FIGS. 7A-D are schematic diagram signaling diagrams illustrating further embodiments of the present disclosure in the context of the 5G network architecture of FIG. 6.
Figure 7B:
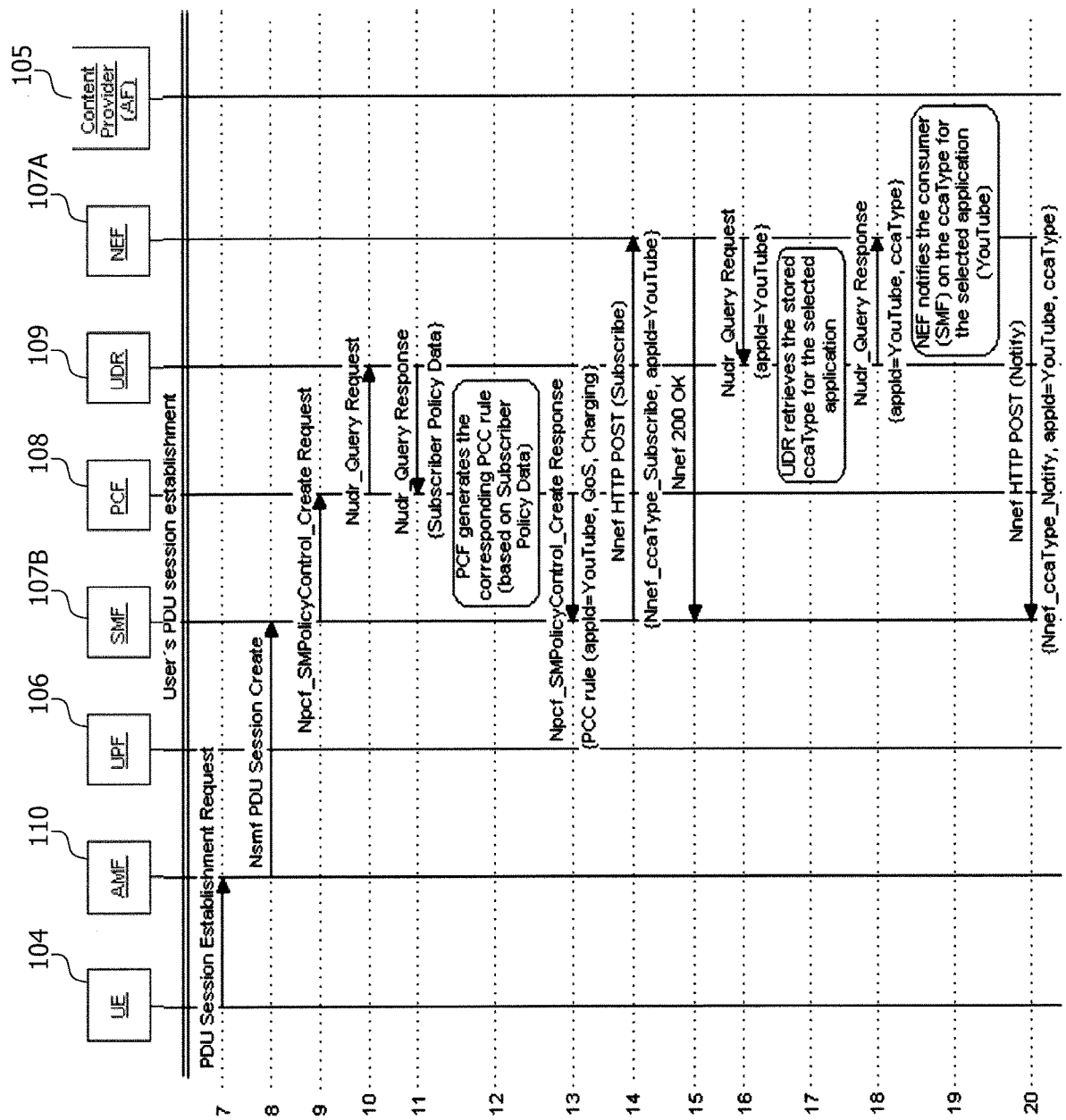
Figure 7C:
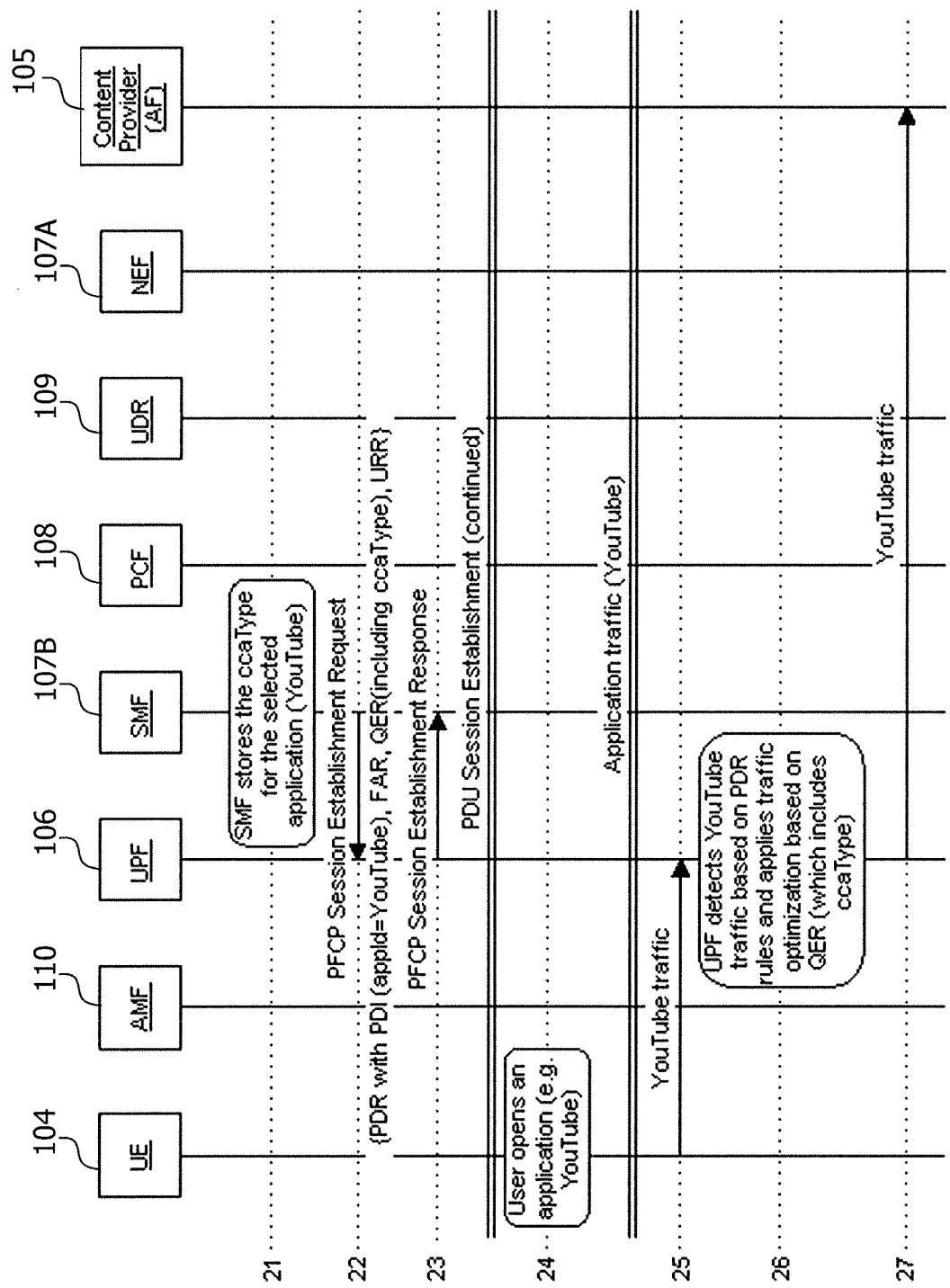
Figure 7D:
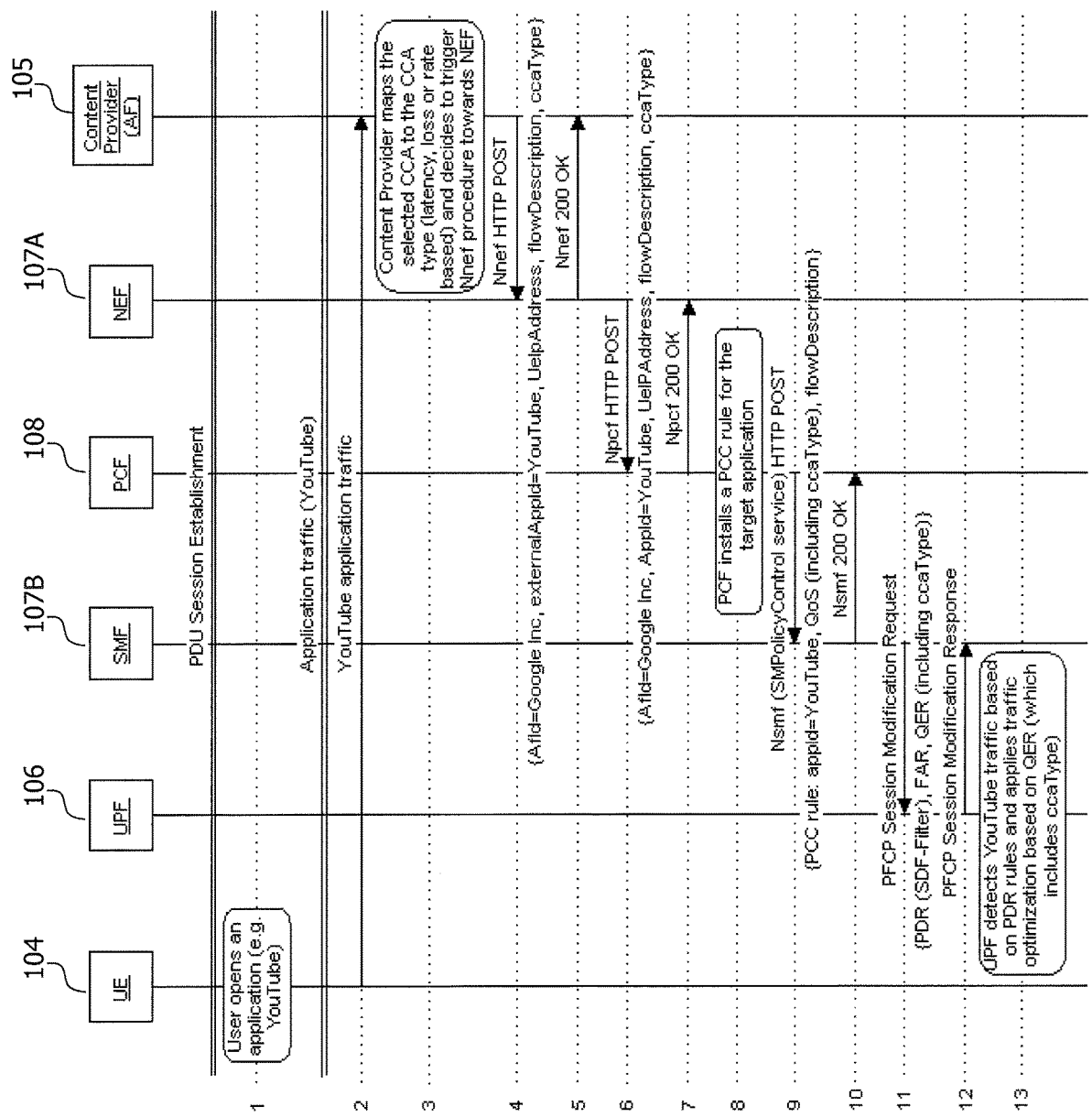

In the following description, exemplary 5G signaling embodiments will be described with reference to FIGS. 7A to 7D. FIGS. 7A to 7C illustrated signaling embodiments in which the CCA information is exposed by the content provider system 101 on a per application basis. FIG. 7D illustrates a signaling embodiment in which the CCA information is exposed by the content provider system 101 on a per flow-basis.

The signaling embodiments of FIGS. 7A to 7C illustrate the specific example of "smart" video traffic optimization/acceleration in the core network domain 102 when a content provider (e.g., Google Inc) operating the AF 105 exposes a default CCA type (as exemplary CCA information) on a per application basis.

In step 1 of FIG. 7A, the content provider's AF 105 is pre-provisioned with the default CCA type for a certain set of one or more applications (including, e.g., YouTube®). The content provider (e.g., Google Inc) typically selects the CCA on a "per application" (e.g., YouTube) basis and/or a "per flow" basis. As an example, the content provider's AF 105 may be pre-provisioned with a default CCA (e.g., CUBIC) and a default CCA type (e.g., loss-based).

The CCA type obtained in step 1) will be exposed as (exemplary) CCA information, via the NEF 107A, towards the core network domain 102 for enabling an enhanced data traffic handling in the core network domain 102. Such a data traffic handling enhancement in the core network domain 102 will lead to an improved QoE on the side of the UE 104.

It is to be noted that in the following exemplary embodiments, only the CCA type is exposed towards the core network domain 102, not the CCA as such. In the following exemplary embodiments, it will be assumed that the data traffic handling in the core network domain will depend on the CCA type, not on the CCA as such. In such embodiments, CCAs may dynamically be changed, and new CCAs may be defined, without having to update the core network domain 102 in this regard.

It is proposed to extend the existing Nnef interface between the AF 105 and the NEF 107A by creating a new procedure to expose CCA information. In this regard, the AF 107 triggers, in step 2), sending of an HTTP POST message including a data set that defines a mapping between (1) an identifier AfId of a content provider (here: Google Inc)

operating or having operated the AF 105 and (2) an identifier externalAppId of the application (outside the core network domain 102) providing the data traffic and (3) CCA information indicative of the type of CCA that will be used by the transport layer protocol on the side of the AF 105. As an example, the data set may be a data tuple including the following three data items (AfId=Google Inc, externalAppId=YouTube, ccaType). The data item, or parameter, CCA type indicates a generic CCA type. The generic CCA type defines in the present embodiment that a latency, loss or rate-based metric will be applied by the transport layer protocol's CCA as congestion indicator. Of course, the CCA types could be extended in the future. Thus, although not shown in FIG. 7A, in case the content provider implements a new default CCA type for a particular application, it is possible for the AF 105 to indicate the new default CCA type in an HTTP PUT message to the NEF 107A.

In step 3), the NEF 107A acknowledges the HTTP POST message with a Nnef 200 OK message. In step 4), the NEF 107A requests the UDR 109 to store the mapping received in step 2). By forwarding in step 4) the association (i.e., the mapping), as received from the AF 105, between the application identifier and the CCA type of the CCA to be applied on the transport layer for the corresponding application, the NEF 107A enables triggering of a traffic handling action by the UPF 106 in a later step of the procedure.

In step 5), the UDR 109 stores as so-called Application Data an association, or mapping, of the following parameters: AfId=Google Inc, externalAppId=YouTube and CCA type. In step 6), the UDR 109 acknowledges the request from the NEF 107A (indicating successful operation).

Steps 1) to 6) are performed "off-line" with respect to an actual application session (here: a YouTube® session) taking place. In other words, the mapping is stored in the UDR 109 before an application session, such as a packet data unit (PDU) session, is established.

Referring now to FIG. 7B, in step 7) the UE 104 triggers PDU session establishment for a YouTube® session, by sending a PDU Session Establishment Request to the AMF 110. It is to be noted that the signaling diagram of FIG. 7B does not include all the signaling messages involved in the PDU Session Establishment procedure.

Responsive to the PDU Session Establishment Request, the AMF 110 selects an SMF 107B to manage the PDU session. An SMF selection function in the AMF 110 selects an SMF instance for example based on information on the available SMF instances obtained from a network repository function (NRF, not shown in FIG. 6) or based on SMF information preconfigured in the AMF 110. The AMF 110 then, in step 8), triggers sending of a Nsmf PDU Session Create message to the selected SMF 107B.

In step 9), the SMF 107B triggers sending of an Npcf_SMPolicyControl_Create Request message to the PCF 108 so as to retrieve session management (SM) policies for the PDU session with the particular UE 104. In step 10), the PCF 108 triggers sending of an Nudr_Query Request message to the UDR 109 so as to retrieve the policy data for this PDU session of UE 104. In step 11), the UDR 109 answers with a Nudr_Query Response message including Subscriber Policy Data for UE 104. Then, in step 12), the PCF 108 generates corresponding PCC rule(s) based on the received Subscriber Policy Data.

In step 13), the PCF 108 triggers sending of an Npcf_SMPolicyControl_Create Response message to the SMF 107B. This message includes the PCC rules to be applied for this PDU session of UE 104. In this case, there will be a PCC rule for the YouTube® application defining some enforcement actions (e.g., in regard to charging and Quality of Service (QoS)). In step 14), and based on the PCC rule(s) received in step 13), in this case a PCC rule with appId=YouTube, the SMF 107B subscribes to the NEF 107A to retrieve the CCA information (i.e., the CCA type) for the YouTube® application. To this end, the SMF 107B triggers the sending of an Nnef HTTP POST message to the NEF 107A indicating subscription to CCA information for appId=YouTube. After receiving the message in previous step, the NEF 107A will respond back to the SMF 107B with an Nnef 200 OK successful response, see step 15).

Then, in step 16), the NEF 107A triggers sending of an Nudr_Query Request message to the UDR 109, which acts as a central data repository, so as to retrieve the CCA information for appId=YouTube. In steps 17 and 18), the UDR 109 retrieves the CCA information for appId=YouTube from a local storage of the UDR 109 and answers the Nudr_Query Request message of the NEF 107A with an Nudr_Query Response message including the retrieved CCA information (i.e., the CCA type parameter as received and stored in step 4)).

In steps 19) and 20), the NEF 107A as a service producer notifies its service consumer (SMF 107B) on the CCA information for the appId=YouTube. To this end, the NEF 107A triggers sending of an Nnef HTTP POST message to the SMF 107B indicating notification and including the received CCA information in combination with the appId=YouTube. The Nnef HTTP POST message thus includes, or defines, a mapping between, on the one hand, the CCA information (i.e., the CCA type parameter) previously communicated by the AF 105 operated by or on behalf of the content provider and, on the other hand, the application service (i.e., YouTube®) that will be provided via the AF 105 or another AF operated by or on behalf of the content provider.

Now reference is made to the signaling diagram of FIG. 7C. As shown therein, after receiving the Nnef HTTP POST message in the previous step, the SMF 107B stores the CCA information for appId=YouTube in step 21) such that the mapping (i.e., the correlation) between the two items of information is maintained. The SMF 107B responds back to the NEF 107A with a Nnef 200 OK successful response (not shown in FIG. 7C).

In step 22), the SMF 107B selects the UPF 106 and triggers sending of a PFCP Session Establishment Request message to the UPF 106. The PFCP Session Establishment Request message will include one or more of the corresponding packet detection rule(s) (PDR(s)), forward action rule(s) (FAR(s)), quality of service enforcement rule(s) (QERs) and usage reporting rule(s) URR(s). These rules are generally defined in 3GPP TS 29.244 v16.0.0, Section 7.5.2. By forwarding to the UPF 106 in step 22) the association (i.e., the mapping), as received from the NEF 107A, between the application identifier and the CCA type of the CCA to be applied on the transport layer for the corresponding application, the SMF 107B enables triggering of a traffic handling action by the UPF 106 as will now be described in more detail.

In the present case, there will be a PDR with packet detection information (PDI) for the application identifier appId=YouTube, and a corresponding FAR, QER and URR. It is further proposed to extend the QER with a new field including the CCA information retrieved from the UDR 109. In particular, this new field may include the CCA type parameter. It is also possible to use a predefined rule for this ("Activate Predefined Rules" information element, IE, within "Create/Update PDR" IE in packet forwarding control protocol, PFCP protocol), where the different CCA types could be locally configured in the UPF 106.

In step 23), the UPF 106 stores the PDR(s)/FAR(s)/QER(s)/URR(s) as received in step and answers back to the SMF 107B with a PFCP Session Establishment Response message.

Then, in step 24), the user operating the UE 104 starts an OTT application (here: YouTube®). As a result, YouTube® data traffic will be transmitted to the UPF 106 and received by the UPF 106 in step 25). It should be noted that the corresponding data traffic received by the UPF 106 could also originate at the AF 105 (that would in the present case be operated by or on behalf of Google Inc as the underlying content provider).

The data traffic between the UE 104 and the AF 105 via the core network domain 102 and the access network domain 103 is sent from the respective endpoint under control of a transport layer protocol such as TCP, QUIC or WebRTC. The transport layer protocol is configured to apply congestion control using a CCA of the CCA type communicated to the core network domain 102 in step 2) of FIG. 7A. Here, it is assumed that the CCA is, for example, Reno. Reno is a CCA of the CCA type "loss based". Of course, other CCAs and other CCA types could be used instead. It will be appreciated that the CCA will be applied (i.e., will be active) on the transport layer without necessarily triggering any congestion control actions in case no congestion is present.

In step 26), the UPF 106 analyzes the data traffic received in step 25) based on the PDR information received in step 22). Traffic detection technologies (e.g., DPI or SPI, heuristics based techniques or techniques that involve the content provider via 3GPP-defined exposure techniques) will be applied by the UPF 106 to this end. As a result of the analysis, an analyzation result is obtained. The analyzation result indicates that the data traffic is generated in the context of a YouTube® application session (i.e., the data packets constituting the data traffic are classified as YouTube data traffic). Based on this analyzation result, the UPF 106 looks up whether CCA information is locally available for the corresponding data traffic. To this end, the UPF 106 matches the analyzation result with one or multiple PDI/QER mappings locally stored at the UPF 106 and obtained as discussed above with reference to steps 1 to 23 of FIGS. 7A to 7C. In the present embodiment, each association between an application identifier in a PDI of a PDR on the one hand and a CCA type parameter in a QER on the other hand, as jointly defined in a PFCP Session Establishment Request message (see step 22) above), defines a corresponding mapping.

If there is a match between the analyzation result and the corresponding application identifier in one of the mappings, the CCA information associated with that application identifier (i.e., the CCA type implemented on the transport layer) is obtained from the mapping (i.e., from the QER received together with the corresponding application identifier in step 22)). Still in step 26), a traffic handling action is triggered to be performed taking into account the CCA type obtained from the mapping. As an example, if the CCA is loss-based, then the traffic handling action could apply some transparent transport proxying or active queue management techniques to adapt to cellular environment (which is low loss).

In the following, a further embodiment will be described with reference to the signaling diagram of FIG. 7D. According to this signaling diagram, the CCA information is exposed by the AF 105 on a per flow basis for a started or ongoing application session involving the UE 104. A precondition of this embodiment is that the UE 104 triggers or has triggered PDU session establishment.

In steps 1) and 2), a user operating the UE 104 starts an OTT application (e.g., YouTube®). For each new YoutTube® data flow, during a handshake process, the client (UE 104) and server (AF 105) endpoints negotiate the transport layer protocol, such as TCP. The CCA (e.g., "New Reno") may in some variants be selected autonomously at the AF 105.

In step 3) the AF 105 operated by or on behalf of the content provider (e.g., Google Inc) maps the selected CCA (e.g., New Reno) to the CCA type (e.g., loss based).

Then, in step 4), the AF 105 triggers a new procedure towards the core network domain 102. In more detail, it is proposed to create a new Nnef northbound API in 3GPP TS 29.522 V16.0.0., Section 4.4, as follows. For initial application session creation, and for each data flow created, the AF 105 sends an HTTP POST message to the NEF 107A. The body of HTTP POST message includes a data tuple comprising (e.g., consisting of) an identifier of the AF 105 (e.g., Google Inc), an identifier externalAppId of the underlying application externalAppId (e.g., YouTube®), an Internet Protocol address of the UE 104, an identifier of the corresponding data flow, such as its flow description (e.g., its 5-tuple), and CCA information indicative of the CCA type of the selected CCA (e.g., loss based). In this data tuple, the CCA information is thus associated with the data flow (i.e., the data traffic). In other words, the HTTP POST message defines a mapping between these two data items.

In case the CCA changes during the data flow and this change results in a different CCA type, it is possible for the AF 105 to indicate the new CCA type by triggering an HTTP PUT message to the NEF 107A. The body of this HTTP PUT message will include the AF identifier (e.g., Google Inc), the externalAppId (e.g., YouTube®), the IP address of the UE 104, the data flow description (e.g., 5-tuple) and CCA information indicative of the new CCA type (e.g., delay based).

In step 5), and after receiving the message in step 4), the NEF 107A authorizes the request, optionally map the externalAppId to an (internal) AppId and respond back to AF 105 (Nnef 200 OK successful response in this case). Then, in step 6), the NEF 107A interacts with the PCF 108 through the Npcf interface by sending the parameters indicated above (AfId, AppId, UE IP address, flow description and CCA type). In this manner, the NEF 107A enables triggering a traffic handling action by the UPF 106 as will now be described in greater detail. Specifically, this triggering is enabled by forwarding the association (i.e., the mapping) between the data flow (as defined by, e.g., the 5-tuple) and the CCA type.

After receiving the message in step 6), the PCF 108 responds back to the NEF 107A (Npcf 200 OK successful response in this case, step 7)) and look for the SMF 107B handling the PDU session corresponding to the UE IP address. The PCF 108 will then trigger a Nsmf HTTP POST message towards the target SMF 107B by installing a PCC rule for the target application including AppId=YouTube, QoS handling (including the CCA type parameter) and the flow description (steps 8) and 9)). The CCA type parameter included as a new QoS handling parameter in the PCC rule is just an exemplary proposal by extending the Dynamic PCC rule. It is also possible to use a Predefined PCC rule for this, where the different CCA types could be locally configured in at least one of the SMF 107B and the UPF 106.

In steps 10) and 11), the SMF 107B responds back to the PCF 108 (Nsmf 200 OK successful response in this case)

and modifies the PFCP session towards the UPF 106 (by triggering sending of an N4 PFCP Session Modification Request, including the corresponding PDR (with PDI type of service data flow, SDF, Filter, which will include the flow description, e.g., 5-tuple), FAR and QER with the CCA type parameter). By forwarding also the mapping between the particular data flow and the associated CCA type, the SMF 107B enables triggering a traffic handling action by the UPF 106. As for step 11), it is proposed to extend the QER with a new field for signaling the CCA type parameter. In a similar way as explained above, it is also possible to use a predefined rule for this ("Activate Predefined Rules" IE within "Create/Update PDR" IE in PFCP protocol), where the different CCA types could be locally configured in the UPF 106.

In step 12), the UPF 106 will answer the SMF 107B with an N4 PFCP Session Modification Response (successful response implies that the UPF 106 has accepted the extended QER rule above). Then, in step 13), the UPF 106 analyzes the received data traffic (of the YouTube® application) based on the PDR information indicated above. In more detail, the UPF 106 receives the data traffic and first evaluates the PDR rules, looking for a match. In this case, the traffic will match a PDR rule with the provisioned SDF-Filter in previous step 11).

If there is a match, data packets related to that data flow (as defined by its 5-tuple) are classified as YouTube® data traffic and a traffic handling action will be triggered to be applied to the classified data traffic as indicated in the QER, specifically taking into account the received CCA type parameter (e.g., loss based). The traffic handling action may result in one or both of traffic optimization and traffic acceleration (e.g., to reduce the bandwidth consumed by the traffic in the access network domain 103).

It will be evident that the solution described herein does not only apply to 5G network architectures. For example, similar mechanisms can be applied to 4G network architectures. In such a case, the role of the AF 105 is taken by an SCS/AS, the role of the NEF 107A is taken by an SCEF, the role of the PCF 106 is taken by a PCRF, the role of the SMF 107B is taken by a PGW-C or TDF-C, and the role of the UPF 106 is taken by PGW-U or TDF-U.

As has become apparent from the above embodiments, a network operator is enabled to apply "smart" traffic handling actions in the core network domain 102 for data traffic generated by a certain application and/or transported in a certain data flow, based on CCA awareness. Some of the embodiments suggest an extension of the Nnef interface (see FIG. 6) by defining a new API allowing the content provider (i.e., the AF 105) to inform the core network domain 102 about a CCA type (or about other CCA information) of a CCA selected for a certain application and/or a certain flow in an application session with a particular UE 103. Additional extensions are possible for the Npcf, Nudr, Nsmf and N4 interfaces to carry this information to the UPF 106 that will use it for improved traffic handling actions. As such, the UPF 106 may perform a content provider-assisted traffic handling optimization.

The continuous evolution of CCAs is a challenge that makes traffic handling optimization a "moving target". For this reason it can be efficient to signal a generic CCA type of a selected CCA to the core network domain 102 rather than the identity of the selected CCA (although this would also be an option in some embodiments).

It will be appreciated that the present disclosure has been described with reference to exemplary embodiments that may be varied in many aspects. As such, the present invention is only limited by the claims that follow.

The invention claimed is:

1. An apparatus for handling data traffic in a core network domain of a communication network, the apparatus being configured to be located in the core network domain and to:
   receive data traffic sent under control of a transport layer protocol that is configured to apply a congestion control algorithm, CCA;
   analyze the data traffic to obtain a data traffic analyzation result;
   obtain, based on the analyzation result, CCA information about a CCA of a plurality of CCAs that can be or is applied by the transport layer protocol; and
   perform a traffic handling action for the data traffic taking into account the obtained CCA information.

2. The apparatus of claim 1, wherein
   the obtained CCA information is indicative of a generic CCA type of the CCA that can be or is applied by the transport layer protocol.

3. The apparatus of claim 2, wherein
   the generic CCA type is indicative of a data traffic-related metric used as a congestion indicator by the CCA.

4. The apparatus of claim 3, wherein
   the data traffic-related metric is selected from a metric set including data rate, data delay, data packet loss, and any combination thereof.

5. The apparatus of claim 1, wherein
   the data traffic is comprised of data packets, and wherein the apparatus is configured to obtain the analyzation result by subjecting the data traffic to packet inspection.

6. The apparatus of claim 1, wherein
   the analyzation result identifies at least one of an application generating the data traffic and a data flow of an application session in which the data traffic is generated.

7. The apparatus of claim 1, wherein
   the CCA information is obtained from a mapping that associates the analyzation result with the CCA information.

8. The apparatus of claim 7, wherein
   the mapping has been configured in the core network domain by a data traffic sender located outside the core network domain.

9. The apparatus of claim 8, wherein
   the data traffic sender is operated by a content provider.

10. The apparatus of claim 7, configured to
    receive the mapping or a portion thereof in a session establishment request or a session modification request.

11. The apparatus of claim 7, wherein
    the mapping is defined by an association between
    a packet detection rule, PDR, and a quality of service enforcement rule, QER, received by the apparatus, wherein the PDR is indicative of a potential analyzation result and the QER is indicative of the CCA information mapped to the potential analyzation result; or
    a PDR and a packet forwarding control protocol, PFCP, information element, wherein the PDR is indicative of a potential analyzation result and the PFCP information element is indicative of the CCA information mapped to the analyzation result.

12. The apparatus of claim 1, configured to
    select a traffic handling rule dependent on the obtained CCA information, wherein the traffic handling rule defines the traffic handling action.

13. The apparatus of claim 1, wherein
the traffic handling action results in the data traffic consuming less band-width in an access network domain of the communication network.

14. The apparatus of claim 1, configured as one of
a user plane function, UPF, of a 5th Generation core network domain;
a user plane packet gateway, PGW-U, of a 4th Generation core network domain; and
a user plane traffic detection function, TDF-U, of a 4th Generation core network domain.

15. An apparatus configured to control handling of data traffic in a core network domain of a communication network, wherein the core network domain is configured to apply a traffic handling action to the data traffic taking into account a congestion control algorithm, CCA, of a plurality of CCAs that can be or is applied by a transport layer protocol controlling the data traffic, the apparatus being configured to be located in the core network domain and to:
receive a mapping that associates the data traffic with CCA information about the CCA of the plurality of CCAs that can be or is applied by the transport layer protocol; and
enable triggering of a traffic handling action for the data traffic in accordance with the CCA information.

16. The apparatus of claim 15, wherein
the data traffic comprises a data flow of an application session in which the data traffic is generated, and wherein the mapping associates the data flow with the CCA information.

17. The apparatus of claim 16, wherein
the mapping is received after the application session has been established or during establishment of the application session.

18. The apparatus of claim 15, configured to
forward the mapping to a core network entity in charge of applying the traffic handling action to the data traffic so as to enable triggering of the traffic handling action.

19. An apparatus configured to send data traffic in accordance with a transport layer protocol that enables application of a congestion control algorithm, CCA, of a plurality of CCAs wherein the data traffic is to be routed through a core network domain of a communication network, wherein the core network domain is configured to perform a traffic handling action for the data traffic taking into account the CCA of the plurality of CCAs, the apparatus being configured to located outside the core network domain and to:
obtain a mapping that associates the data traffic with CCA information about the CCA of the plurality of CCAs that can be or is applied by the transport layer protocol;
send the mapping to the core network domain so as to enable triggering of a traffic handling action for the data traffic in accordance with the CCA information; and
send the data traffic to the core network domain in accordance with the transport layer protocol.

20. A method of handling data traffic in a core network domain of a communication network, the method comprising the following steps performed in the core network domain:
receiving data traffic sent under control of a transport layer protocol that is configured to apply a congestion control algorithm, CCA, of a plurality of CCAs;
analyzing the data traffic to obtain a data traffic analyzation result;
obtaining, based on the analyzation result, CCA information about the CCA of the plurality of CCAs that can be or is applied by the transport layer protocol; and
performing a traffic handling action for the data traffic taking into account the obtained CCA information.

* * * * *